E. B. COBURN.
CUTTING MACHINE FOR PASTRY.
APPLICATION FILED APR. 14, 1909.
939,981.
Patented Nov. 16, 1909.
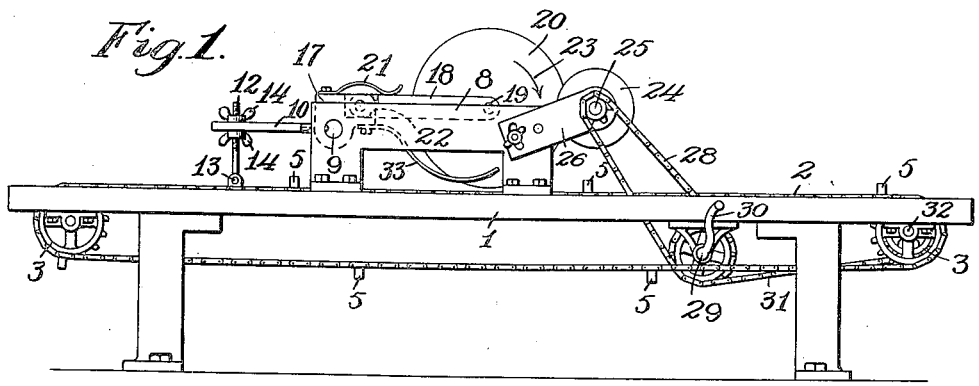
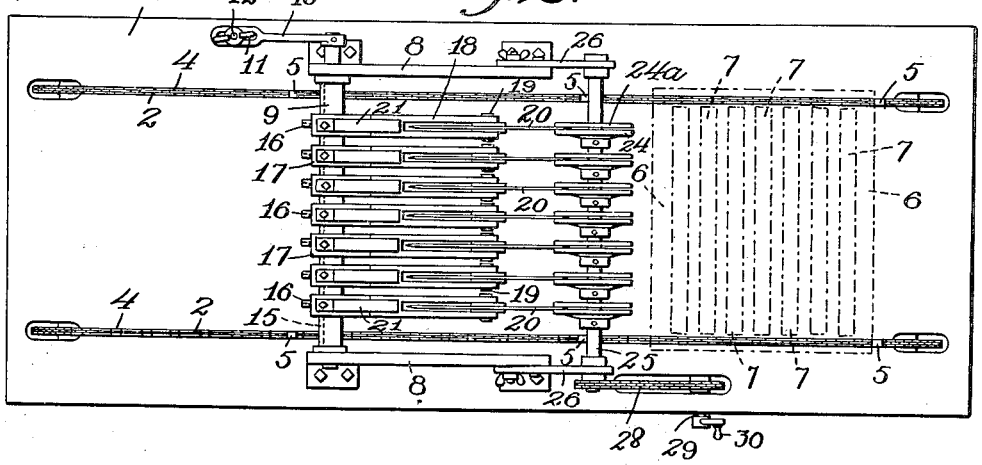
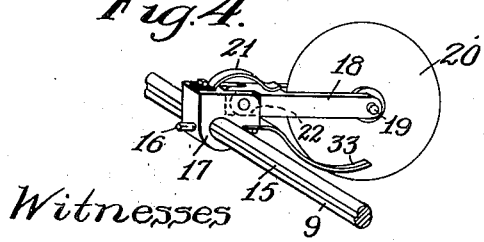
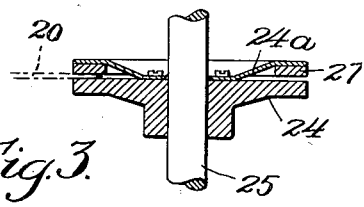
Witnesses
Ray D. Tolman.
Penelope Comberbach.
Inventor
Edward B. Coburn.
By Rufus B. Fowler
Attorney

UNITED STATES PATENT OFFICE.

EDWARD B. COBURN, OF WORCESTER, MASSACHUSETTS.

CUTTING-MACHINE FOR PASTRY.

939,981.

Specification of Letters Patent. Patented Nov. 16, 1909.

Application filed April 14, 1909. Serial No. 489,959.

*To all whom it may concern:*

Be it known that I, EDWARD B. COBURN, a citizen of the United States, residing at Worcester, in the county of Worcester and Commonwealth of Massachusetts, have invented a new and useful Improvement in Cutting-Machines for Pastry, of which the following is a specification accompanied by drawings, forming a part of the same, in which—

Figure 1 is a side elevation of my improved cutting machine. Fig. 2 is a plan view. Fig. 3 is a detached view in section of one of the driving disks for rotating the cutting blades. Fig. 4 is a perspective view of an arm for holding one of the rotating cutters.

Similar reference figures refer to similar parts in the different views.

The object of my present invention is to provide an inexpensive, efficient, and simple mechanism for the use of bakers in cutting pastry, and especially for severing sticks of pastry containing figs, or other fruit, and it consists in the construction and arrangement of parts as hereinafter described and pointed out in the annexed claims.

Referring to the accompanying drawings 1 denotes a supporting table, across the top of which a pair of endless chains 2, 2, carried upon sprocket wheels 3, 3, are made to pass. The chains 2, 2, travel in grooves 4, 4, formed in the table top between the sprocket wheels adapted to receive the greater portion of the chain, so that a pan or other receptacle, as it is moved over the top of the table by the forward movement of the chains will have a bearing upon the top of the table. The chains 2, 2, are provided with lugs 5, 5, which project upward from the links of the chain as they pass over the table and are adapted to engage the rear edge of a pan in the position indicated by the broken lines 6, Fig. 2. The chains 2, 2, are placed outside the space on the table 1 which is occupied by the material to be cut and outside the cutting disks in order to allow the free lateral adjustment of the cutting disks; the feeding movement of the chains being imparted directly to the pan 6 on which the material to be cut is supported.

The sticks of pastry held upon the pan 6 as it is taken from the oven are indicated in Fig. 2 by the broken lines 7. Held in a framework 8 mounted upon the top of the table is a rod 9, having attached to one end a radial arm 10 having a slot 11 in its free end which incloses a screw threaded bolt 12, pivoted at its lower end in lugs 13 upon the top of the table. The screw threaded bolt 12 is provided with wing nuts 14, 14, which allow the radial arm 10 to be adjusted upon the bolt 12 in order to impart a slight rocking motion to the rod 9. The rod 9 is provided with a longitudinal groove 15 to receive the tips of set screws 16 held in arms 17 which are mounted upon the rod 9 and maintained in alinement by means of the set screws which enter the groove 15. Pivoted to the arms 17 are bifurcated levers 18, in the free ends of which are carried pins 19 on which are journaled the rotating cutting disks 20. Springs 21 are carried by the arms 17 and bear against the levers 18 to hold them in their depressed position and resting against the shoulders 22 of the arms 17.

The cutting disks 20 are rotated in the direction of the arrow 23 by means of driving disks 24 carried upon a rotating shaft 25 journaled in brackets 26 and adjustably held upon the frame 8. The driving disks 24 have attached to one side an elastic washer 24ª, to the rim of which is attached an annular piece of felt, rubber, or other friction material 27, presenting an opposing surface to the side of the disk 24. The edge of the cutting disk 20 is inserted between the side of the disk 24 and the friction ring 27, as shown in Fig. 3. The shaft 25 is connected by a sprocket chain 28 with a shaft 29 which may be driven by power or by hand by means of a crank 30. When the cutting disks engage the material to be cut and a resistance is thereby offered to their rotary movement, the force exerted by the driving disks 24 will tend to depress the cutting disks and increase their pressure upon the material to be cut, enabling the tension of the springs 21 to be light and only sufficient to hold the levers 18 normally against the shoulders 22 of the arms 17. When the disks 20 are free to descend the springs 21 therefor, offer little resistance to the rising movement of the disks as they pass over the edges of the pan or over inequalities in the bottom of the pan.

Rotary motion is imparted to the sprocket wheels 3, 3, by means of a sprocket chain 31 connecting the shaft 29 with a shaft 32, upon which one pair of sprocket wheels 3 are mounted. Attached to the arms 17 is a fender plate provided with curved fingers 33 which extend downwardly between the cutting disks 20 in order to prevent the pastry adhering to the cutting disks from being lifted.

The operation of my improved cutting machine is as follows:—The pan 6 containing the sticks of pastry 7 as it is taken from the oven is placed upon the chains 2, 2. Rotary motion is then imparted to the shaft 29 causing the lugs 5 to engage the rear edge of the pan and move it forward beneath the cutting disks 20. The cutting disks 20 having been adjustably set to reach the bottom of the pan by means of the adjusting radial arm 10 and nuts 14, are rotated in the direction of the arrow 23 by the driving disks 24, severing the sticks 7 into short lengths, equal to the distance between the disks. As the levers 18 carrying the cutting disks 20 are hinged to the arms 17 and pressed downward by the springs 21, the disks 20 will be capable of an upward movement as they pass over raised surfaces or inequalities in the bottom of the pan. The driving disks 24 are attached by set screws to the shaft 25 and are therefore capable of adjustment according to the spaces between the cutting disks 20 and the spaces between the latter may be adjusted by moving the arm 17 along the rod 9.

I claim,

1. In a pastry cutting machine, a supporting table, a feeding mechanism, a series of rotating cutters, means for applying a yielding pressure to each of said cutters independently, and means for simultaneously adjusting said cutters vertically.

2. In a pastry cutting machine, a supporting table, a feeding mechanism, a series of rotating cutters, means for applying a yielding pressure to each of said cutters independently, means for simultaneously adjusting said cutters vertically and means for limiting the downward movement of said cutters.

3. In a pastry cutting machine, a supporting table, a series of rotary cutters journaled above said table, a pair of endless chains extending across said table outside said cutters provided with lugs for engaging a pan or support for the material to be cut, means for simultaneously adjusting said cutters relatively to said supporting table, and means for the lateral adjustment of said cutters between said chains.

4. In a pastry cutting machine, a rocking shaft, arms splined to said shaft and longitudinally adjustable thereon, levers pivoted on said arms, shoulders on said arms to limit the downward movement of said levers, springs carried by said arms bearing on said levers, cutters carried by the free end of said levers, and means for axially adjusting said shaft.

5. In a pastry cutting machine, a series of rotating cutters, a support for the material to be cut, a driving mechanism for said cutters consisting of rotating disks in frictional engagement with the edges of said cutters and arranged to rotate the engaged edges of said cutter toward said support, pivoted levers supporting said cutters, and means for limiting the downward movement of said levers.

6. In a pastry cutting machine, a support for the material to be cut, a rod held above and transversely to said support, arms adjustably attached to said rod, levers pivoted to said arms, rotating cutters journaled in the free ends of said arms, means for applying a yielding pressure to said levers, and shoulders on said arms for limiting the movement of said levers.

7. In a pastry cutting machine, a feeding mechanism, a rod supported transversely to the line of feed, a series of arms attached to said rod, levers pivoted to said arms, rotating cutters journaled in the free ends of said levers, means for rotating said cutters, and a fender plate having curved fingers attached to said arms.

8. In a pastry cutting machine, a feeding mechanism, a rod held transversely to the line of feed, arms adjustably attached to said rod, levers pivoted to said arms, a series of rotating cutters journaled in the free ends of said arms, and means for adjusting said rod rotatively to vary the vertical position of said cutters.

EDWARD B. COBURN.

Witnesses:
 PENELOPE COMBERBACH,
 RUFUS B. FOWLER.